INVENTOR.
JACK J. BAIER
BY
Morrison Kennedy & Campbell.
ATTORNEY.

March 5, 1968
J. J. BAIER
3,371,378
APPARATUS FOR PRODUCING EXTRUDED TUBES COMPOSED
OF EXTRUDABLE THERMOSETTING RESINS CONTAINING
REINFORCING FIBERS OF FINE TEXTURE
Original Filed March 25, 1963
3 Sheets-Sheet 3
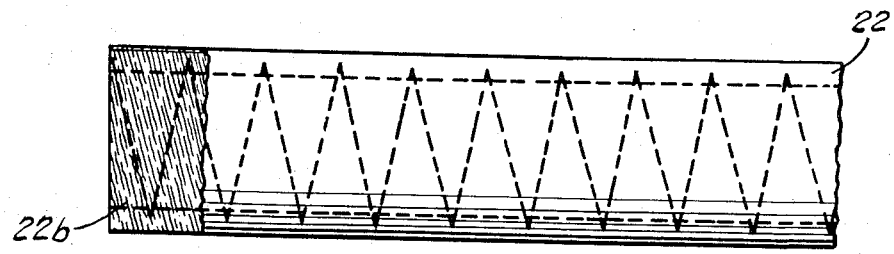
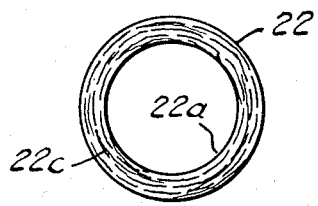
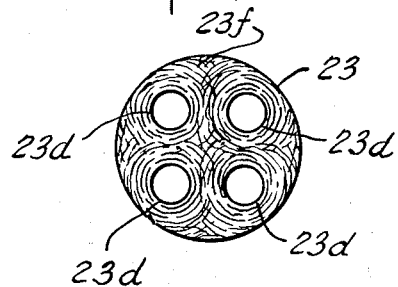
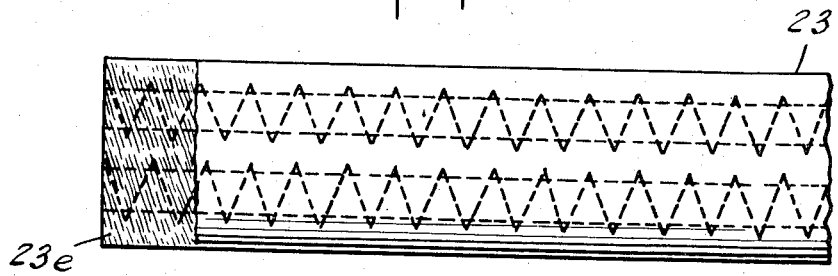
INVENTOR.
JACK J. BAIER
BY
Morrison, Kennedy & Campbell
ATTORNEYS.

United States Patent Office 3,371,378
Patented Mar. 5, 1968

3,371,378
APPARATUS FOR PRODUCING EXTRUDED TUBES COMPOSED OF EXTRUDABLE THERMOSETTING RESINS CONTAINING REINFORCING FIBERS OF FINE TEXTURE
Jack J. Baier, 518 Manhasset Woods Road, Manhasset, N.Y. 11030
Original application Mar. 25, 1963, Ser. No. 267,720. Divided and this application July 28, 1966, Ser. No. 568,447
6 Claims. (Cl. 18—12)

ABSTRACT OF THE DISCLOSURE

An apparatus for producing extruded tubes composed of extrudable thermosetting resins and suitable fibers oriented for circumferential reinforcement of said tubes, said apparatus having a mandrel therein and having a support for positioning said mandrel at its inner end, and said mandrel being in the form of a ring arranged with helically arranged vanes which redirect the reinforcing fibers in a circumferential direction during the extrusion.

---

This application is a division of my copending application Ser. No. 267,720, filed Mar. 25, 1963, now abandoned.

The present invention relates generally to the manufacture of extruded tubes of thermosetting resins and in particular to the incorporation therein of suitable fibers for improving the impact strength as well as the tensile strength.

The normal extrusion process has been content with end products which have been made up solely of suitable resins and wood or carbon fillers in the form of wood floor or graphite, and it is only lately that the necessity has arisen for products having greater impact and tensile strengths necessitating the addition of fibers composed of glass, basalt wool, nylon, Dacron, etc. The practice of coating the fibers prior to extrusion is also very important in order to obtain a homogeneous mass in the end product, and there already exists several methods of accomplishing this difficult task in a satisfactory manner. The most common extruded products in which the increased strengths are needed are tubes in which there are a suitable plurality of cavities to be used for hydraulic, electrical or electronic uses, and it is with this background in mind that the instant invention was conceived. In the normal extrusion machine used for producing these fiber reinforced tubes, the material which is forced through the die has a strictly linear movement, and it has therefore been impossible to orient the fibers in a circumferential direction in order to obtain better strengths.

The main object of the present invention is to extrude a tube of the type mentioned by orienting the fibers in a helical direction around the cavity in the tube in order to reinforce the cured thermosetting resin both axially and circumferentially. This is accomplished by forming the fiber reinforced thermosetting resin while in a fluid condition into and through a suitably contoured die and around a suitably contoured mandrel and causing the resin while still in fluid condition to follow a helical path around the mandrel and thus orient the fibers in a corresponding direction; thereafter the thermosetting resin is cured in the die with the fibers thus oriented.

In carrying out the foregoing method, the mandrel mounting ring, which is located at the entrance end of the die and which forms part of the die, is equipped with a plurality of helically disposed vanes arranged in fluid tight relation both with the mandrel and the inside bore of the mounting ring, thus providing helical passages which are open at one end to receive the fiber reinforced thermosetting resin from the source of supply and which are open at the other end to discharge the resin into the main portion of the die, whereby the fibers during the flow of the thermosetting resin through the helical passages in the mounting ring will be oriented in a helical direction around the mandrel in order to reinforce the cured thermosetting resin both axially and circumferentially.

Figure 1:
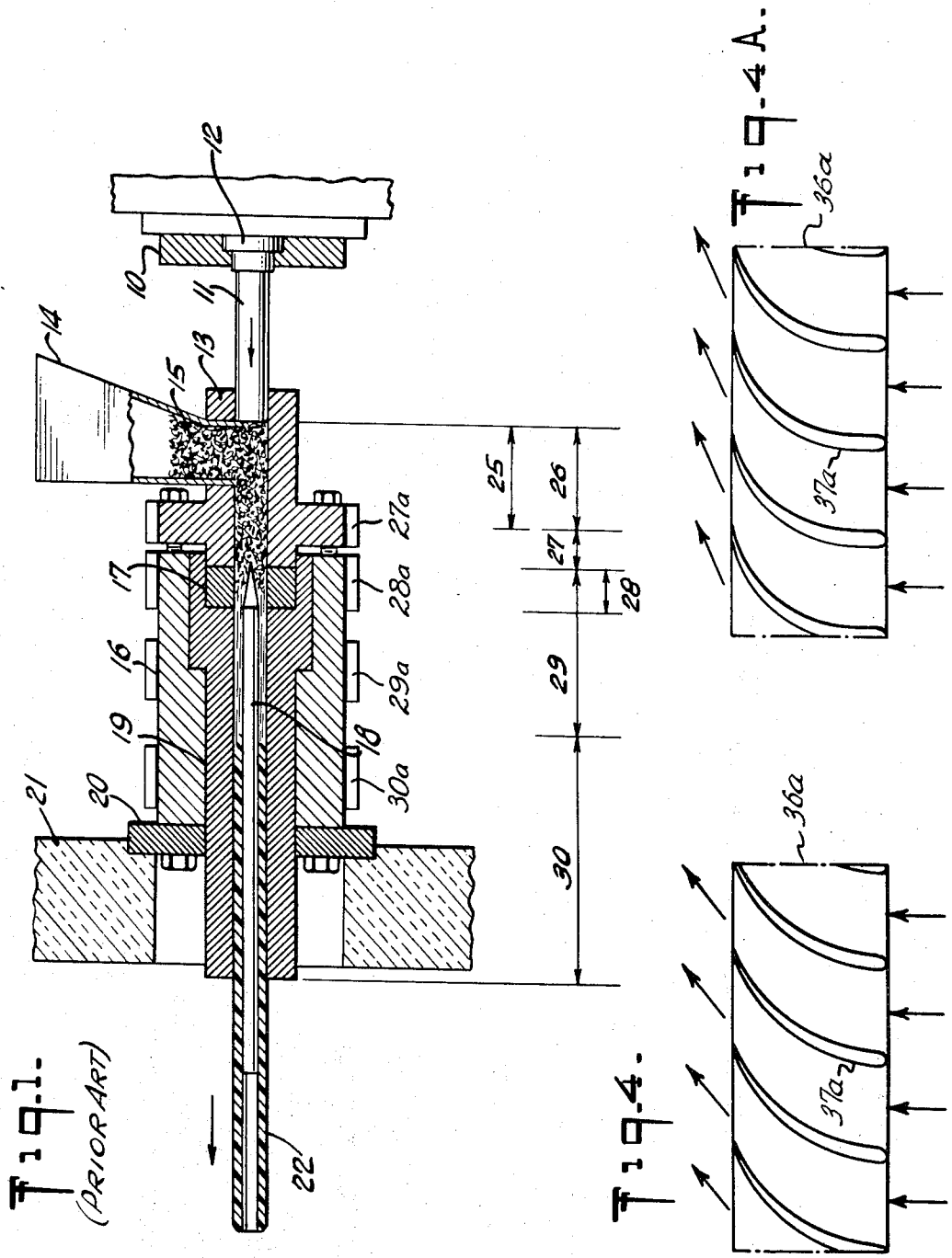
Figure 2:
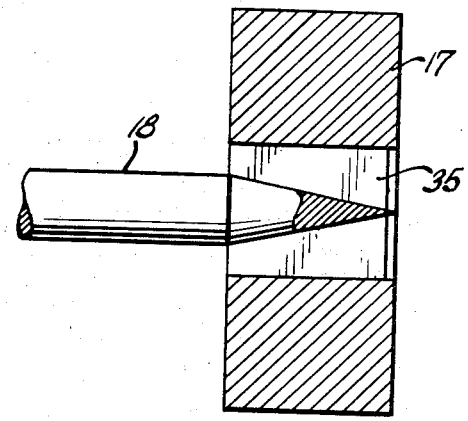
Figure 2A:
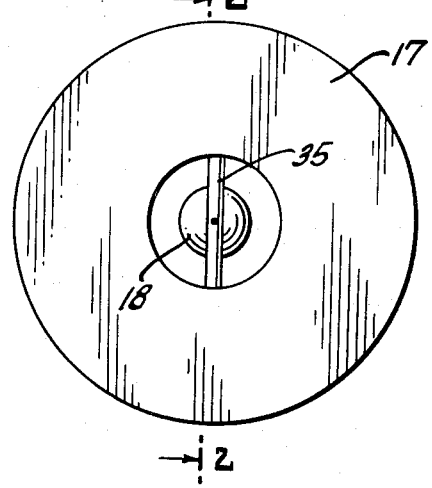
Figure 3:
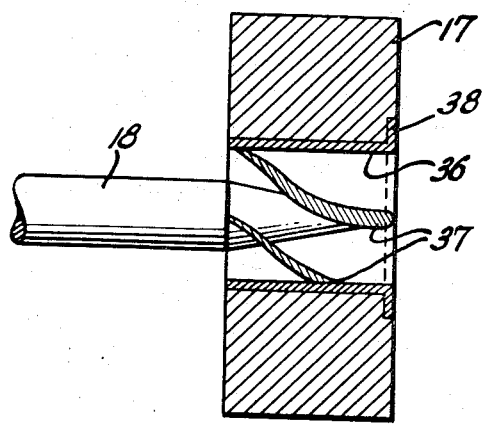
Figure 3A:
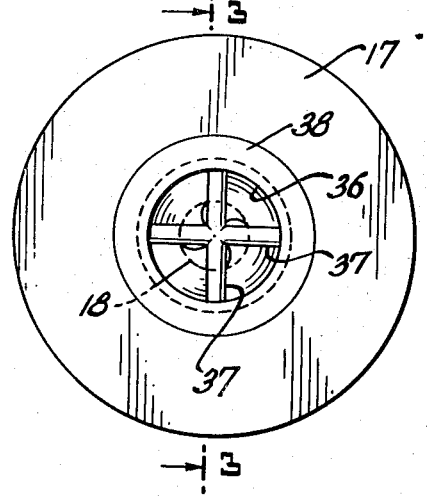

In the drawings:
FIG. 1 is a sectional view of a conventional extruding machine which may be used in the practice of the instant invention;
FIG. 2 is a vertical section through the conventional mounting ring of FIG. 1;
FIG. 2A is a face view of the mounting ring shown in FIG. 2;
FIG. 3 is a vertical section corresponding to that of FIG. 2 but showing the mounting ring equipped with the helical vanes which characterize the present invention;
FIG. 3A is a face view of the mounting ring shown in FIG. 3;
FIG. 4 is a flat development of the cylindrical sleeve shown in FIG. 3 with the helical vanes contoured to produce helical vanes of one desired pitch;
FIG. 4A is a view similar to FIG. 4 but showing the vanes as contoured according to a different pitch;
FIG. 5 is an elevation of a section of an extruded tube produced in accordance with the invention and broken away at one end to reveal the helical disposition of the reinforcing fibers in the thermosetting resin. The zig-zag lines indicated show the theoretical disposition of the helical vanes if they were continued throughout the length of the tube;
FIG. 5A is a view taken from the left end of FIG. 5 and showing the circumferential disposition of the reinforcing fibers;
FIG. 6 is a view similar to FIG. 5 but showing an extruded tube formed with four different cavities, the tube being broken away at one end to reveal the helical disposition of the reinforcing fibers. The zig-zag lines indicated show the theoretical disposition of each cavity if continued throughout the length of the tube; and
FIG. 6A is a view taken from the left end of FIG. 6 and showing the four cavities and the circumferential direction of the fibers around each cavity.

Referring to FIG. 1, the conventional extruding machine therein shown is provided with a punch 11 mounted and centered in a mounting plate 10 by means of a flange 12 and actuated in a straight line along the center line of the machine in short strokes by means of a double acting hydraulic cylinder capable of producing pressures between 2000 lbs. and 10,000 lbs. per square inch. The fiber reinforced thermosetting material 15 is fed from a hopper 14 through an opening in a water-cooled feed box 13 containing a cylindrical bore into which the material is forced by the punch 11 whereby the material is first compressed. It will be understood that the punch 11 is made to fit tightly within the bore so as to effect the desired compression of the material and then force it through a mandrel mounting ring 17 arranged at the entrance end of a die 19 and forming part of said die. A mandrel 18 is located centrally within the die 19 and is shaped conically at the entrance end of the die, as shown in FIG. 2, being supported in that position by radial vanes 35 integral with the mounting ring 17 as well as with the mandrel 18. In this conventional construction, as will be evident, the reinforcing fibers in the thermosetting resin will pass through the mounting ring 17 in a straight axial direction. The die 19 is centered and contained in a bolster 16 which in turn is mounted on a back plate 20 anchored to the stationary cross head 21. In turn the water-cooled feed box 13, which is mounted at the entrance end of the die 19, locks the mandrel mounting ring 17 with the central mandrel 18 in fixed position. In the instance shown, the product is a tube 22 containing a single continuous cavity extending throughout its length.

In operation the punch 11 on its forward power stroke will compress the resin coated fibers under the high pressure above indicated and force the material into and through the mandrel mounting ring 17 around the mandrel 18.

Heat is applied to the mandrel mounting ring 17 in order to convert the fiber reinforced thermosetting resin into a fluid condition and thus render it flowable into and through the die 19 around the mandrel 18. The die 19 is likewise heated throughout a substantial portion of its length at the entrance end to render the material completely homogeneous after passing through the mandrel mounting ring and it is the heat contained in the die and the continued pressure that is exerted throughout the length of the die that completely cures the material in the die. At its exit end, the die is so sized as to provide a smaller opening around the mandrel than that existing in the forming portion of the die and as a result there is created within the die a back-up pressure equal and opposite to that exerted by the punch 11 operated by the hydraulic cylinder. In other words, in operation the material is first compressed, heated to fluid condition, formed in such fluid condition, and then further heated to cure the thermosetting resin in the die. Before the cured material leaves the die it is cooled sufficiently to harden and set the mass in a rigid condition.

In FIG. 1, below the section of the extruding machine, there is a diagram which clearly reveals the operating cycle from the time the fiber reinforced thermosetting resin is fed into the machine from the hopper 14. The line 25 indicates the extent of the stroke of the punch 11 in traversing the bore of the feed box 13 to compress the material into a homogeneous mass. The line 26 indicates the extent of the loosely packed resin coated fibers filling the bore of the feed box 13 when the punch 11 is in its retracted position. As will be noted, the lines 25 and 26 are of equal length. The line 27 indicates the portion of the bore of the feed box 13 containing the tightly packed resin coated fibers already subjected to pressure and therefore compacted by the previous stroke of the punch 11 but still not heated sufficiently to become fluid due to the cooling means 27a containing continuously circulating cold water which controls and carries off the heat. The line 28 indicates the extent of the first heated zone and it is in this zone that the thermosetting resin is heated and made fluid by means of electric heater 28a to allow the material to be extruded through the die 19 and around the central mandrel 18 to form the tube 22 with its single continuous cavity. The line 29 indicates a further zone in which the fluid resin is subjected to suitable pressure and heat to cure the resin by means of electric heater 29a and then continue the cure until it is completed. The line 30 indicates the period during which the cured resin is cooled to a stable and rigid condition before it leaves the die.

From the foregoing description it will be apparent that as the resin becomes fluid in the area of the mandrel mounting ring, where the heat is first applied, the fibers in the fluid mass will orient themselves in a straight axial direction or parallel with the center line of the mandrel due to the flow of the heated mass in a straight axial direction. As a result, the cured tube will be strongly reinforced in an axial or longitudinal direction but very little reinforcement in a circumferential direction.

Coming now to the present invention:

The mandrel mounting ring 17 of FIGS. 2 and 2A will be replaced by the mandrel mounting ring 17a of FIGS. 3 and 3A. Referring to these two latter views, it will be noted that the mounting ring 17a is formed with an inner cylindrical sleeve 36 which forms a part thereof and the bore of which will correspond with the bore of the die. In lieu of the straight radial vanes 35, the cylindrical sleeve 36 is formed with a plurality (four in the present instance) of helically disposed vanes 37 extending throughout the length of the sleeve 36 and providing helical passages around the tapered end of the mandrel 18, which helical passages as shown are open at one end to receive the fiber reinforced material from the bore of the water-cooled feed box 13 and which are also open at the other end to discharge the material in fluid condition into the main portion of the die 19, whereby the fibers during the flow of the thermosetting resin through the vane created passages in the mounting ring will be oriented in a helical direction around the mandrel in order to reinforce the finished tube both axially and circumferentially.

As previously stated, the vanes 37 are arranged in fluid-tight relation to the mandrel 18 as well as the cylindrical sleeve 36. In fact, all three of these parts are integrally united and may be inserted in or removed from the machine as a unit. In FIG. 3, the sleeve 36 is shown with an annular flange 38 which locates the sleeve in proper position within the main portion of the mounting ring 17a, and it will also be noted that the sleeve is anchored in place by contact of the flange 38 with the adjacent face of the feed box 13.

As a most practical way of forming the helical vanes 37 in the sleeve 36 reference is made to FIGS. 4 and 4A, which show that the sleeve 36 and the vanes 37 are fabricated from a flat sheet 36a and from preformed contoured vanes 37a, which latter are welded to the flat sheet along one edge. Thereafter the flat sheet with the attached vanes is formed into cylindrical shape to fit within the mounting ring 17a by rolling the flat sheet about its short axis. However, before the thus formed sleeve is inserted in the mounting ring 17a, the vanes 37a are welded to the conical face of the center mandrel 18. It is in this way that the mandrel 18, the vanes 37 and the sleeve 36 are rigidly attached into a unit which can be inserted in and removed from the mounting ring 17a without having to remove the latter from the machine, as has heretofore been necessary in the case of the conventional mounting ring 17 shown in FIGS. 2 and 2A.

As another expedient of manufacture, the flange 38 may be separately preformed and then welded to the end of the sleeve 36 after it has been formed into cylindrical shape.

It may be explained that the contour of the vanes 37a is not only such as to impart to them the desired helical shape and pitch but also to locate both of their ends radially when the flat sheet 36a is formed into cylindrical shape by rolling the flat sheet about its short axis. This is clearly shown in FIG. 3A, in which there are four vanes 37 arranged at 90° apart. By changing the pitch of the vanes, the fibers will be oriented at corresponding angles.

A section of a finished tube produced in accordance with the invention is shown in FIG. 5. In this view, the tube is formed with a single cavity 22a, as shown in FIG. 5A. The helical orientation of the fibers is revealed in the broken away portion 22b of FIG. 5 and the circumferential orientation of the fibers is revealed at 22c in FIG. 5A.

FIG. 6 shows a tube produced by the present invention and containing four cavities 23d arranged symmetrically about the axis of the tube. It will be understood that in producing such a tube four different cylindrical sleeves 36 with their attached vanes 37 will be supported by a spider arrangement in a common mandrel mounting ring 17 whose bore will correspond with the bore of the die (outside tube diameter). As previously explained, in such a four cavity tube the fibers will be arranged helically around each different cavity as revealed by the broken away portion 23e in FIG. 6. The circumferential lay of the fibers is indicated at 23f in FIG. 6A.

While there has been disclosed in the foregoing description a specific presently preferred manner of practicing the disclosure of the present invention, it is to be understood that various modifications, omissions, and refinements which depart from the disclosed embodiment of the discosure of the present invention may be adopted without departing from the spirit and scope of this invention.

What is claimed is:

1. A machine for extruding a tube composed of an extrudable thermosetting resin containing circumferentially oriented reinforcing fibers of fine texture and presenting a continuous cavity throughout its length, the combination of a suitably contoured die through which the fiber reinforced thermosetting resin is forced under high pressure from a source of supply by means of a hydraulically operated ram, a suitably contoured mandrel located within the die and extending throughout the entire length of the die and slightly therebeyond for forming the continuous cavity in the tube, a mandrel mounting ring located at the entrance end of the die and forming a part of the die, means for heating and curing and cooling the thermosetting resin as it is forced through the die around the mandrel, and a plurality of helically disposed vanes arranged within the mandrel mounting ring in fluid-tight relation with both the mandrel and the inside bore of the mounting ring, said vanes providing passages which are open at one end to receive the fiber reinforced thermosetting resin from the source of supply and which are open at the other end to discharge said resin into the main portion of the die, whereby the fibers during the flow of the fluid thermosetting resin through the passages in the mounting ring will be oriented in a helical direction around the mandrel in order to reinforce the cured thermosetting resin both axially and circumferentially.

2. A machine for extending a tube according to claim 1, wherein the pitch of the helically disposed vanes is predetermined in accordance with the desired angularity of the fibers in the finished tube.

3. A machine for extruding a tube according to claim 1, wherein the length of the helically disposed vanes is predetermined in accordance with the desired parallelism of the fibers in the finished tube.

4. A machine for extruding a tube according to claim 1, wherein both the pitch and the length of the helically disposed vanes are predetermined in accordance with the desired angularly and parallelism of the fibers in the finished tube.

5. A combination according to claim 1, wherein the helically disposed vanes are formed within a cylindrical sleeve distinct from but attached to and forming a part of the mandrel mounting ring.

6. A combination according to claim 5, wherein the cylindrical sleeve, the helically disposed vanes, and the mandrel are removable and replaceable as a unit.

References Cited
UNITED STATES PATENTS

| | | | |
|---|---|---|---|
| 121,166 | 11/1871 | Griffin | 18—14 XR |
| 1,904,884 | 4/1933 | Royle. | |
| 2,210,004 | 8/1940 | Rautenstrauch | 18—14 XR |
| 2,280,022 | 4/1942 | Banigan et al. | 264—108 XR |
| 2,682,081 | 6/1954 | Fisch | 18—14 XR |
| 2,787,022 | 4/1957 | Chisholm. | |
| 2,973,783 | 3/1961 | Boe. | |
| 3,256,560 | 6/1966 | Adomaitis. | |
| 3,168,509 | 2/1965 | Juel | 264—108 |

FOREIGN PATENTS

| | | |
|---|---|---|
| 322,522 | 11/1934 | Italy. |
| 69,347 | 1/1952 | Netherlands. |

WILLIAM J. STEPHENSON, *Primary Examiner.*